UNITED STATES PATENT OFFICE 2,459,029

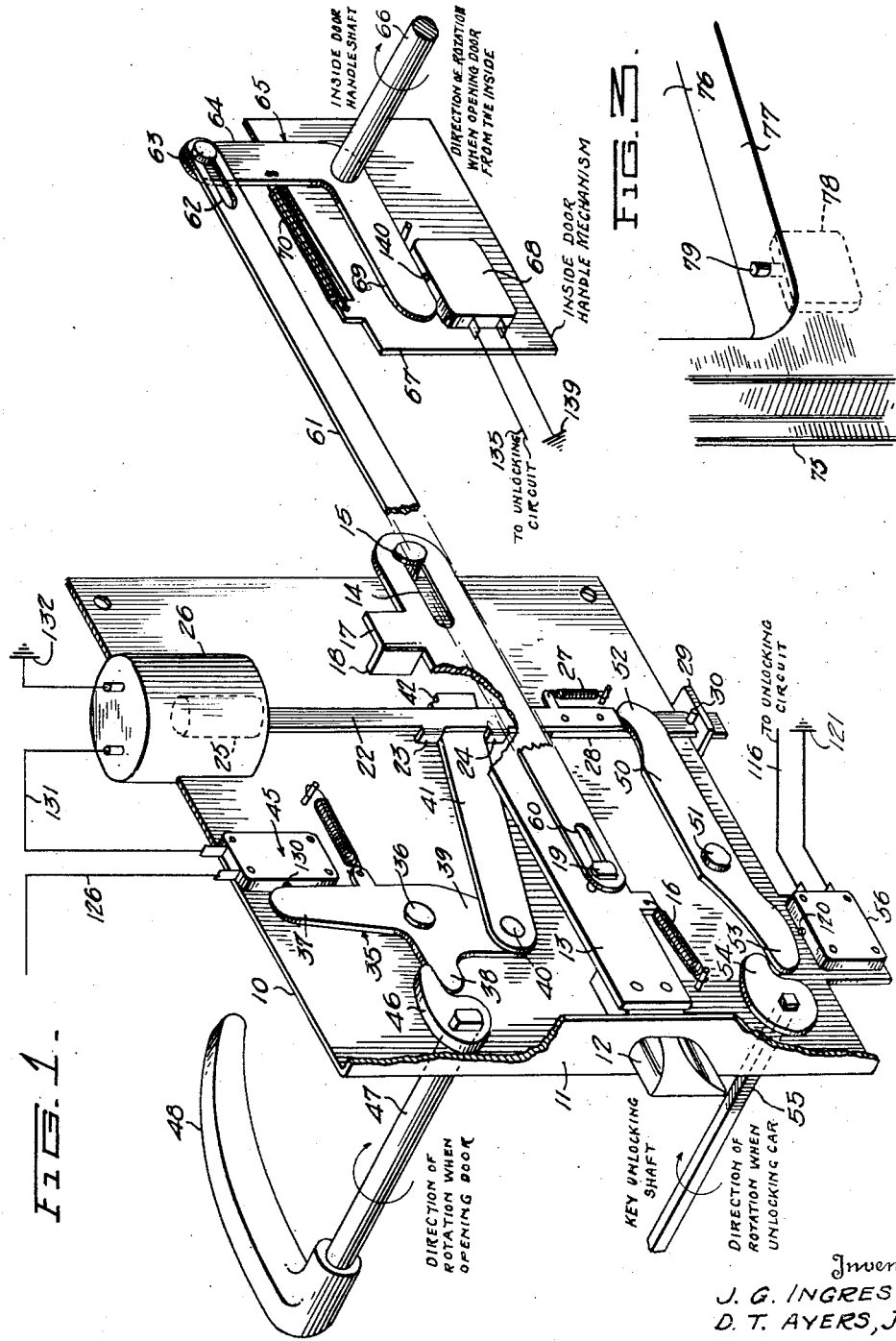

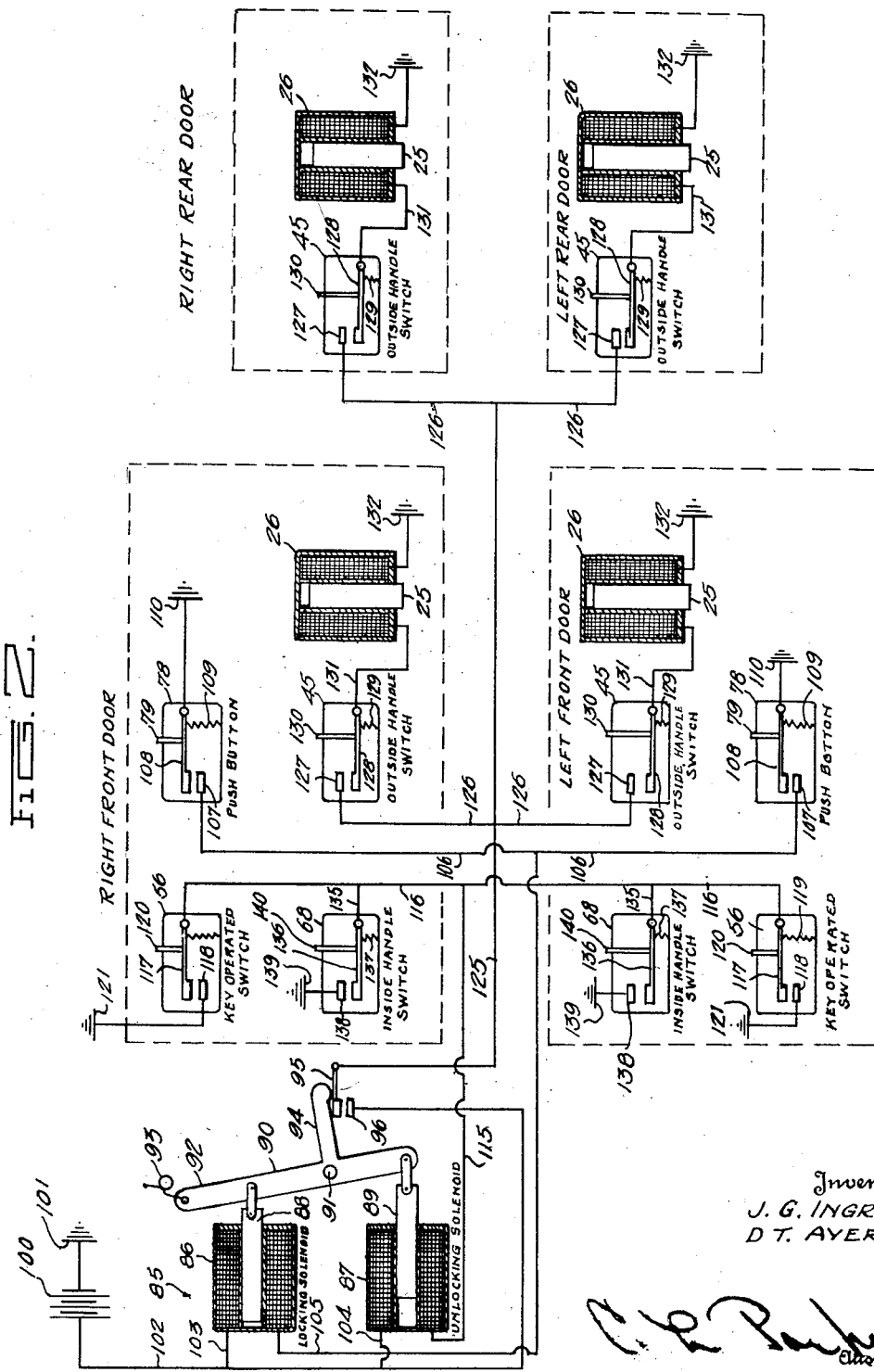

DOOR LOCKING SYSTEM

Jeannot G. Ingres and David T. Ayers, Jr., Richmond, Va., assignors to Empire Electric Brake Company, Newark, N. J., a corporation of New Jersey Application April 17, 1946, Serial No. 662,870

19 Claims. (Cl. 70—264)

This invention relates to door latch control mechanisms, and more particularly to such a mechanism adapted for use with motor vehicle doors for controlling the locking and unlocking thereof.

As is well known, present day automobile door latches are provided with means whereby they may be locked to prevent unauthorized entrance into the vehicle. Each door of the vehicle is provided with its own locking mechanism which requires individual operation. In order to lock the vehicle, therefore, it is necessary for the operator to separately "set" the mechanism for each door. The same procedure must be followed in the unlocking of the individual doors.

An important object of the present invention is to provide a simple, easily operable mechanism whereby an operator, upon leaving a motor vehicle, may lock all of the doors thereof by simple operation of a single control element, such as a push button associated with one or both of the front doors of the vehicle.

A further object is to provide such a mechanism wherein a simple control mechanism is provided for each door and each such mechanism, in turn, is under the control of a master control mechanism located at any suitable part of the vehicle and through which all of the door latches may be locked or unlocked.

A further object is to provide such a mechanism which is electrically operated and is of such nature that all of the door latching means are subject to manual control in the usual manner and wherein the electrical means employed are normally deenergized, thus preventing any drain on the vehicle battery.

A further object is to provide such a mechanism which permits an occupant within a vehicle to lock all of the doors thereof, but wherein means is provided for preventing an occupant from inadvertently leaving the vehicle with the doors locked, thereby possibly locking the ignition key in the vehicle.

A further object is to provide such a mechanism wherein the inside door handles function to automatically unlock the system, if it has been previously locked, by the customary operation of the inside door handle thus rendering it unnecessary for the operator even to be aware of the fact that the doors have been locked from the inside when opening a door to leave the vehicle.

A further object is to provide individual electrically operated door latch control mechanisms under the control of a simple master switch which may be operated by one, or by either of a plurality of, push buttons to lock the doors, and may be simply operated by a key to render the locking means inoperative to permit manual operation of any of the outside door handles.

A further object is to provide such a system wherein the operation of the key-controlled shaft from the outside of the vehicle electrically operates the master switch to render the locking means inoperative, and wherein the turning of such shaft, in the event the battery has become "dead" during the absence of the driver, will manually set the parts to permit the manual opening of the doors.

Other objects and advantages of the invention will become apparent during the course of the following description.

In the drawings we have shown one embodiment of the invention. In this showing—

Figure 1 is a perspective view of a locking mechanism associated with one of the front doors of a vehicle, parts being broken away and some of the electrical connections being diagrammatically illustrated, Figure 2 is a diagrammatic showing of the electrical devices employed in the system showing the various control circuits, and Figure 3 is a fragmentary perspective view of a portion of one of the front vehicle doors showing the preferred location of the push buttons operable for locking the doors.

In Figure 1, a latch mechanism for one of the front vehicle doors of a motor vehicle is illustrated. Referring to Figure 1, the numeral 10 designates a carrier plate conventionally employed in most motor vehicles. This carrier plate is housed within the door and is flanged at one end as at 11 at the free edge of the door. A latch 12 is slidable through the flange 11 and is connected to the adjacent end of a flat bar 13 the opposite end portion of which is slotted as at 14 to receive the shank of a guide pin 15 carried by the plate 10. The bolt 12 and its operating bar 13 accordingly are supported for linear movement toward and away from the keeper (not shown) for the latch 12, and a spring 16 is connected to the bar 13 and plate 10 to urge the latch 12 toward latching position. Toward this end remote from the latch 12, the bar 13 is provided with an upwardly extending portion 17 having an inturned end 18 for a purpose to be described. The bar 13 is also provided with a headed pin 19 through which the door may be unlatched from an inside handle mechanism to be referred to later.

A control rod 22 is vertically arranged as shown in Figure 1 between the body of the plate 10 and the bar 13 and is provided with laterally extending fingers 23 and 24 for a purpose to be described. The upper end of the rod 22 is connected to the armature 25, to be referred to later, of a solenoid 26 energizable to move the rod 22 upwardly. A spring 27 urges the rod 22 downwardly, and the lower end of this rod is connected to an offset extension 28 slidable in a guide lip 29 extending laterally from the plate 10. A stop pin 30 engages the lip 29 to limit downward movement of the bar 22 and its extension 28.

A lever indicated as a whole by the numeral 35 is pivoted as at 36 to the plate 10 and is provided with three arms 37, 38 and 39. The arm 39 is connected by a pin 40 to a bar 41 the opposite end portion of which is arranged between the fingers 23 and 24. The bar 41 has its free end normally arranged lower than the finger 18 so that turning movement of the lever 35 would move the end of the bar beneath the finger 18 without imparting movement thereto. It will become apparent that when the solenoid 26 is energized, the finger 24 raises the free end of the bar 41 to position it for engagement with the finger 18 to impart unlatching movement to the bar 13. The free end of the bar 41 preferably has its upper corner portion right-angularly notched as at 42 for a purpose to be described.

The lever arm 37 is arranged to control a small switch indicated as a whole by the numeral 45, and as will be described later, the normal position of the lever arm 37 holds the switch 45 open. The lever arm 38 is engageable by an arm 46 carried by the shaft 47 to which the usual outside door handle 48 is connected. Rotation of the shaft 47 in the direction of the arrow in Figure 1 will effect the unlatching of the latch 12 to permit the door to open, but this is dependent upon energization of the solenoid 26 by movement of the arm 37 from the switch 45, which operation will be referred to more in detail later.

Near the bottom of the plate 10 is arranged a lever 50 pivotally connected to the plate as at 51. One end of the lever 50, as indicated by the numeral 52, lies against the projection 28 beneath and adjacent lower extremity of the bar 22. The other end 53 of the lever 50 is engageable by an arm 54 carried by the usual shaft 55 controlled by the key-operated lock (not shown). Beneath the lever end 53 is arranged a normally open switch 56 which is adapted to be closed upon substantial downward movement of the lever end 53 incident to rotation of the key-operated shaft 55 in the direction of the arrow in Figure 1.

The pin 19 is operable in a slot 60 formed in a link 61. The opposite end of this link is slotted as at 62 to receive a pin 63 carried by one arm 64 of a bell crank lever 65 connected to the shaft 66 of the usual inside door handle associated with motor vehicle doors. The shaft 66 extends through a plate 67 adjacent to which the bell crank lever 65 is arranged. A normally open switch 68 is carried by the plate 67 and is adapted to be closed by movement of the other arm 69 of the bell crank lever upon a door-unlatching turning movement of the shaft 66 in the direction of the arrow in Figure 1. A spring 70 holds the bell crank lever 65 in the normal position shown in Figure 1, in which position the lever arm 69 holds the switch 68 open.

Assuming that the apparatus is employed with a four-door sedan, the mechanism shown in Figure 1 will be employed for each front door of the vehicle. The same mechanism also will be employed for the two rear doors except that the key-operated shaft 55 and associated elements, including the lever 50 and switch 56, and the switch 68 associated with the inside door handle, will be omitted.

It will be noted that only one solenoid is used in conjunction with the latch mechanism of each vehicle door. It also will be noted that three small, simple switches are employed for each front door, and only one switch, namely the switch 45, is employed for each rear door. These electrical elements are quite small and cheaply manufactured and are available as standard articles of manufacture. An additional small manually controlled switch is associated with each front door. Referring to Figure 3, a portion of one of the front doors of the vehicle has been illustrated and indicated by the numeral 75. This door has the usual window 76 having a lower sill 77, and the additional switch referred to is arranged within the door beneath the sill 77 as indicated by the numeral 78. This switch is operable by a push button 79 projecting upwardly through sill 77 adjacent the free edge of the door 75. One of these switches and a control circuit therefor is preferably provided for each front door and either of these switches may have its push button 79 operated to effect the locking of all of the vehicle doors, as will be described.

The wiring system for the mechanism is shown diagrammatically in Figure 2 and the mechanism associated with each individual door has been enclosed within a dotted line rectangle designated by suitable legends to indicate the respective doors. Referring to Figure 2, numeral 85 indicates as a whole the master switch through which the locking and unlocking functions of the apparatus are controlled. This master switch may be located at any desired inaccessible and invisible point in the vehicle, for example, behind the instrument panel, and is suitably housed. The master switch comprises a pair of solenoids 86 and 87 respectively provided with armatures 88 and 89 connected to a switch lever 90 pivoted intermediate the armatures as at 91. The lever 90 is provided with a projected end 92 to which is connected an over-center spring 93 for holding the lever 90 in either of its two positions to be referred to. A lateral projection 94 on the lever 90 is engageable with a switch arm 95 whereby, upon energization of the solenoid 87, such switch arm will be moved into engagement with a stationary contact 96.

A source of current, such as the vehicle battery, is indicated by the numeral 100, and has one terminal grounded as at 101. A main supply wire 102 is connected to the other terminal of the battery and is provided with branches 103 and 104 each of which is connected to one terminal of one of the solenoids 86 and 87. The wire 102 leads to the stationary contact 96.

The second terminal of the solenoid 86 is connected to one end of a wire 105 and this wire branches as at 106 for connection with stationary contacts 107 arranged in the switches 78. Each of these switches includes an arm 108 normally held out of engagement with its contact 107 by its spring 109 and movable into engagement therewith by operation of the associated push button 79. The arm 108 of each push button switch is grounded at 110.

The second terminal of the solenoid 87 is connected to one end of a wire 115 which branches as at 116 for connection with switch arms 117 in each of the key-operated switches 56. Each of these switch arms is normally out of engagement with an associated stationary contact 118 and is held in normal position by a spring 119. Each switch arm 117 is provided with an operating button 120 engageable by the lever end 53 (Figure 1) to close the switch upon operation of the associated key-operated shaft 55 (Figure 1). Each stationary contact 118 is grounded as at 121.

The switch arm 95 of the master switch is connected to one end of a wire 125 and this wire is provided with four branches 126. Each of these branches leads to a stationary contact 127 in each of the switches 45. Each switch 45 is provided with a switch arm 128 engageable with the associated contact 127 and normally urged into engagement therewith by a tension spring 129. Each switch arm 128 is provided with an operating button or the like 130 normally engaged by the associated lever arm 37 (Figure 1) to keep the switch arms 128 in open position. Each switch arm 128 is connected by a wire 131 to one terminal of the associated solenoid 26, and the other terminal of each of these solenoids is grounded as at 132.

The foregoing description covers a fully operative latch controlling system for automobile door latches. However, it is highly desirable to provide in such a system a cooperating means whereby an operator will be prevented from inadvertently leaving the vehicle with the system set for locking the doors. In other words, assuming that the driver may have purposely locked the doors while he is in the vehicle by having depressed one of the buttons 79 (Figure 3) or by having accidentally depressed such button with his hand or elbow, he may later leave the vehicle and close the doors with the ignition key still in the ignition switch. He will thereafter, upon returning to the vehicle, find it impossible to gain entrance thereinto. The switches 68, which may be associated only with the front doors of a four-door vehicle are employed for preventing the driver from inadvertently locking himself out of the vehicle. Referring to Figure 2, each branch wire 116 is provided with a further branch wire 135 leading to a switch arm 136 in each of the switches 68. Each switch arm is urged by a compression spring 137 into engagement with a stationary contact 138, grounded as at 139. Each switch arm 136 is provided with an operating finger 140 or the like normally engaged by the lever arm 69 (Figure 1) of the inside door handle mechanism whereby the switch arms 136 are normally held open. As will become apparent, the opening of either front door from the inside will result in closing one of the switch arms 136 to unlock the entire system.

The operation of the apparatus is as follows: The master switch 85 is normally arranged with the lever 90 swung clockwise to its normal position holding the switch arm 95 in engagement with the contact 96. Under such conditions, a circuit is closed through each of the solenoids 26 except at the respective switches 45. These switches are normally open, as stated above, and accordingly no current normally flows through the solenoids 26. Assuming that the operator is outside the car and desires to enter thereinto, he will operate one of the handles 48 in the usual manner, turning the associated shaft 47 in the direction of the arrow in Figure 1. The arm 46 will turn in the same direction and, in engaging the lever arm 38, will rock the lever 35 in a counterclockwise direction. The lever arm 37 thus will start to move generally toward the left in Figure 1, and the first increment of movement of the lever 35 thus will release the switch arm 128 of the associated switch 45, the lever arm 37 relieving pressure on the button 130. This will complete a circuit through the associated solenoid 26 to ground 132 and through ground 101 back to the source 100.

Energization of the solenoid 26 will lift the armature 25 and the associated bar 22 and the finger 24 will elevate the bar 41 into a position in alignment with the finger 18. Continued operation of the handle 48 will then continue the counterclockwise rotation of the lever 35 and the bar 41 will exert a pressure on the finger 18 to move the latch bar 13 and latch 12 to the right to unlatch the door. The door thus may be opened manually in the usual manner, and when the operator releases the handle 48, the parts operated thereby will return to their normal positions with the lever arm 37 depressing the previously operated button 130 to open the associated switch 45. The associated latch-operating bar 41 will thus be dropped below the finger 18 to its normal position.

Assuming that the operator will have operated the handle 48 with extreme rapidity, it is possible that the upper corner of the free end of the bar 41, in the absence of the notch 42, might have moved beneath the finger 18 during such complete rapid movement of the handle 48. In practice, it has been found that by providing the notch 42, such inadvertent operation is prevented. If the free end of the bar 41 reaches a position with its extremity in vertical alignment with the forward face of the finger 18 before the upper edge of the bar 41 moves to a position above the lower extremity of the finger 18, the inner extremity of the notch 42 will engage the finger 18 and unlatch the door in the manner previously described.

It will be apparent that the circuit through either solenoid 26 may be closed by operation of its associated switch arm 128, but the circuit to each solenoid 26 is dependent upon the position of the parts of the master switch 85. The circuits through all of the solenoids 26 will be prevented from being closed by operation of either outside door handle if the switch arm 95 is out of engagement with the contact 96. This is the condition which is established when all of the car doors are to be locked. If the driver desires to leave the vehicle and lock the doors, he may open either front door to leave the vehicle therethrough and may press the push button 79 associated with such door. Under such conditions, current will flow from the source 100 through wires 102 and 103, solenoid 86, wire 105 and either wire 106, dependent upon which front door push button is operated, thence through the associated contact 107 and switch arm 108 and back to the battery through grounds 110 and 101. The locking solenoid 86 thus will be energized and its armature 88 will swing the lever 90 to the position shown in Figure 2, the switch arm 95 being disengaged from the contact 96. The main control circuit, having thus been broken between contact 95 and switch arm 96, the operation of an outside door handle will not close a circuit through the associated solenoid 26 and the door cannot be opened. Under such conditions, a door-opening operation of the handle 48 will move the associated bar 41 while the latter remains in its lower position and the free end of the bar will merely move beneath the finger 18, and accordingly no motion can be imparted to this finger or to the latch bar 13 and latch 12. The door thus will remain latched.

When the operator returns to the car and desires to unlock the doors, he will insert a key in the lock of conventional construction (not shown) provided in each front door and will turn the key and consequently the associated shaft 55 (Figure 1) in the direction indicated by the arrow. The arm 54 will engage the lever end 53 and move it downwardly until it engages and moves the associated button 120 downwardly, whereupon the corresponding switch arm 117 will engage the stationary contact 118. The current will then flow from the battery 100 through wires 102 and 104, through solenoid 87 and wire 115, through one of the wires 116, depending upon which front door lock is being operated, thence through the corresponding switch 117 and contact 118 and back to the source through grounds 121 and 101. This operation energizes solenoid 87 and the armature 89 will swing the arm 90 back to its normal position to engage the switch arm 95 with the contact 96. The door control circuits will then be restored to their normal conditions and either door handle may be operated to open the corresponding door. Thus it will be apparent that the mere turning of the key in one of the locks will simultaneously restore all of the door control circuits associated with the outside handles and either vehicle door may be opened from the outside.

The over-center spring 93 is employed for holding the switch lever 90 in either of its two positions after it has been moved to such position. As is true of all of the circuits in the apparatus, the circuits for the solenoids 86 and 87 are only momentarily closed, thus minimizing the drain on the battery, and the master switch parts will remain indefinitely in either position to which they are moved.

It is becoming the increasing practice, as a matter of safety, for drivers, and particularly women, to lock the doors of a motor vehicle while they are driving or remaining inside of the vehicle. It will be apparent that the driver of a vehicle equipped with the present system may push one of the buttons 79 at any time and the doors of the vehicle will be locked. Thus, the driver may lock himself or herself inside the vehicle. It also will be apparent that the button 79 is placed in a highly convenient position adjacent the rear end of the sill 76 of each front door. The driver may inadvertently rest his or her elbow on the button 79 of the left-hand front door, in which case the master switch will be set to lock all of the doors. Regardless of whether the driver has deliberately or inadvertently pushed one of the buttons 79, he may leave the car without locking it unless he so desires. Assuming that the doors are locked with the driver inside, the master switch will be set as shown in Figure 2. Upon leaving the car, the driver will turn the inside door handle (not shown) to turn the shaft 66 in the direction of the arrow in Figure 1, thus manually pulling the bar 61 to unlatch the door. At the same time, the lever arm 69 will move upwardly to release the associated button 140, and the corresponding switch arm 136 will engage the stationary contact 138. Each of the switches 68 is in parallel with its associated key-operated switch 56 and functions in the same manner to energize the unlocking solenoid 87.

Thus, if the car has been locked from the inside, the mere opening of the door by operation of the shaft 66 will restore the unlocked position of the master switch. The driver is thus prevented from inadvertently leaving the car locked with the ignition key inside, and if he desires to lock the car when leaving it, he must do so deliberately by pressing one of the buttons 79.

It will be apparent that the wiring system is quite simple and minimizes the number of wires which run to each door. For example, only three wires need extend to each front door, and conveniently may be run into the hinged edge of the door in actual practice. In this connection, it will be noted that the wire 135 of each front door is connected to the associated wire 116 before the latter leaves the door. The wire 116 thus constitutes one of the three wires connected to each front door, the other two being the wires 106 and 126. For the rear doors, only one of the wires 126 extends into each door. The wiring system accordingly greatly simplifies the installation of the mechanism.

It also will be noted that only a single solenoid is employed for each of the doors, the locking and unlocking circuits being under the main control of the master switch. This switch may be placed at any desired point and the use of a single solenoid in each door also simplifies installation. No master and subsidiary locks are employed, all of the locks operating on the same principle and the locking and unlocking circuits being entirely separate and being controlled by the master switch.

All of the push bars 41 of the various doors are biased under all conditions to a locking position and nothing in the mechanical operation of any of the parts will disturb such normal arrangement. In other words, there is nothing associated between the bars 13 and 41 which established a mechanical connection therebetween, and accordingly the handle of the door latch mechanism in which a locking operation has been established need not be held down while closing the door. Such mechanical connection between the bars 13 and 41 has been necessary in prior constructions to avoid the inadvertent locking of the car. This is unnecessary in the present system since, as stated above, the operation of one of the indoor handles of either front door when the operator leaves the car insures the unlocking of the parts. This obviously prevents the inadvertent locking of the car.

No unlocking button is required for unlocking this system. It merely is necessary to insert an ordinary key in its lock and turn the associated shaft 55 to energize the unlocking circuit in the manner previously stated. If, after leaving the car, the battery should become "dead" and thus prevent energization of the unlocking circuit, the operator may turn the key and the lever end 52 will elevate the bar 22. Holding the key in the position for raising the bar 22, the operator may then rotate the handle 48 to open the car door. While the system is electrically operated, therefore, the driver is enabled to unlock the car even if the battery is "dead."

We claim:

1. In a door locking mechanism wherein the door is provided with a latch, a handle for operating the latch, a member movable to a first position in which the handle is operative for releasing the latch, and to a second position in which the handle is inoperative for releasing the latch; means constantly biasing said member to said second position, a solenoid energizable for moving said member to said first position, a circuit for said solenoid comprising a pair of switches in series, one of said switches being biased to closed position to move to such position upon initial operation of said handle to energize said solenoid if the other switch is closed, a push button operable solely for opening said other switch, and key-controlled means carried by the door for closing said other switch.

2. In a door locking mechanism wherein the door is provided with a latch, a handle for operating the latch, a member movable to a first position in which the handle is operative for releasing the latch, and to a second position in which the handle is inoperative for releasing the latch; means constantly biasing said member to said second position, a solenoid energizable for moving said member to said first position, a circuit for said solenoid comprising a pair of switches in series, one of said switches being biased to closed position to move to such position upon initial operation of said handle to energize said solenoid if the other switch is closed, a push button operable for opening said other switch, key-controlled electrical means for closing said other switch, and mechanical means operable by said key-controlled means if no current is available for said solenoid for moving said member to said first position.

3. In a door locking mechanism wherein the door is provided with a latch, a handle for operating the latch, a member movable to a first position in which the handle is operative for releasing the latch, and to a second position in which the handle is inoperative for releasing the latch; means constantly biasing said member to said second position, a solenoid energizable for moving said member to said first position, a circuit for said solenoid comprising a pair of switches in series, one of said switches being biased to closed position to move to such position upon initial operation of said handle to energize said solenoid if the other switch is closed, a pair of electromagnetic devices respectively operable solely for opening and closing said other switch, a circuit for one electromagnetic device of said pair comprising a push button operable for closing such circuit to open said other switch, said push button being biased to an inoperative position, a circuit for the other electromagnetic device of said pair comprising a switch operable for closing such circuit to close said other switch and carried by the door, and key-controlled means for operating said last named switch.

4. In a door locking mechanism wherein the door is provided with a latch, a handle for operating the latch, a member movable to a first position in which the handle is operative for releasing the latch, and to a second position in which the handle is inoperative for releasing the latch; means constantly biasing said member to said second position, a solenoid energizable for moving said member to said first position, a circuit for said solenoid comprising a pair of switches in series, one of said switches being biased to closed position to move to such position upon initial operation of said handle to energize said solenoid if the other switch is closed, a pair of electromagnetic devices respectively operable for opening and closing said other switch, a circuit for one electromagnetic device of said pair comprising a push button operable for closing such circuit to open said other switch, a circuit for the other electromagnetic device of said pair comprising a switch operable for closing such circuit to close said other switch and carried by the door, a mechanical device movable for closing said last named switch, and a key-operated device for operating said mechanical device, said mechanical device having mechanical connection with said member to move the latter to said first position in the event no current is available for said last named circuit upon operation of said last named switch.

5. In a door locking mechanism wherein the door is provided with a latch, an outside door handle for releasing the latch, and an inside door handle for releasing the latch, and a member movable to a first position in which said outside door handle is operative for releasing the latch and to a second position in which the outside door handle is ineffective for releasing the latch; means constantly biasing said member to said second position, control means operable upon initial operation of said outside door handle for overcoming said biasing means to move said member to said first position whereby continued movement of said outside door handle will release the latch, manually operable means for rendering said control means ineffective for overcoming said biasing means, and means operable by said inside door handle upon a latch-releasing movement thereof for rendering said manually operable means ineffective for controlling said control means.

6. In a door locking mechanism wherein the door is provided with a latch, an outside door handle having a normal position from which it is movable for releasing the latch, and an inside door handle for releasing the latch, and a member movable to a first position in which said outside door handle is operative for releasing the latch and to a second position in which the outside door handle is ineffective for releasing the latch; means constantly biasing said member to said second position, an electro-magnetic device energizable for moving said member to said first position, a circuit for said electro-magnetic device comprising a switch biased to closed position and held in open position when said outside door handle is in normal position, and movable to closed position upon initial operation of said outside door handle, manually operable means for preventing said switch from closing said circuit whereby said member will remain in said second position, and means operable by said inside door handle upon a latch-releasing movement thereof for rendering said manually operable means ineffective for preventing said switch from closing said circuit.

7. In a door locking mechanism wherein the door is provided with a latch, an outside door handle having a normal position from which it is movable for releasing the latch, and an inside door handle for releasing the latch, and a member movable to a first position in which said outside door handle is operative for releasing the latch and to a second position in which the outside door handle is ineffective for releasing the latch; means constantly biasing said member to said second position, an electro-magnetic device energizable for moving said member to said first position, a circuit for said electro-magnetic device comprising a switch biased to closed position and held in open position when said outside door handle is in normal position, and movable to closed position upon initial operation of said outside door handle, a second switch in said circuit in series with said first mentioned switch, manually controlled means for opening said second switch, and means operable by said inside door handle upon a latch-releasing movement thereof for closing said second switch.

8. In a door locking mechanism wherein the door is provided with a latch, an outside door handle having a normal position from which it is movable for releasing the latch, and an inside door handle for releasing the latch, and a member movable to a first position in which said outside door handle is operative for releasing the latch and to a second position in which the outside door handle is ineffective for releasing the latch; means constantly biasing said member to said second position, an electro-magnetic device energizable for moving said member to said first position, a circuit for said electro-magnetic device comprising a switch biased to closed position and held in open position when said outside door handle is in normal position, and movable to closed position upon initial operation of said outside door handle, a master switch remote from said door and connected in series with said first named switch, means subject to manual operation for opening said master switch, and an electro-magnetic device energizable for closing said master switch and comprising a circuit including a switch manually operable by said inside door handle upon a latch-releasing movement thereof for closing said master switch.

9. In a door locking mechanism wherein the door is provided with a latch, an outside door handle having a normal position from which it is movable for releasing the latch, and an inside door handle for releasing the latch, and a member movable to a first position in which said outside door handle is operative for releasing the latch and to a second position in which the outside door handle is ineffective for releasing the latch; means constantly biasing said member to said second position, an electro-magnetic device energizable for moving said member to said first position, a circuit for said solenoid comprising a switch biased to closed position and held in open position when said outside door handle is in normal position, and movable to closed position upon initial operation of said outside door handle, a master switch remote from said door and connected in series with said first named switch, means subject to manual operation for opening said master switch, an electro-magnetic device energizable for closing said master switch and comprising a circuit including a switch manually operable by said inside door handle upon a latch-releasing movement thereof for closing said master switch, and an auxiliary switch in said last named circuit in parallel with said last named switch, the door having a key-operated mechanism manually operable for closing said auxiliary switch to energize said last named electro-magnetic device to close said master switch.

10. In a door locking mechanism wherein the door is provided with a latch, an outside door handle having a normal position from which it is movable for releasing the latch, and an inside door handle for releasing the latch, and a member movable to a first position in which said outside door handle is operative for releasing the latch and to a second position in which the outside door handle is ineffective for releasing the latch; means constantly biasing said member to said second position, an electro-magnetic device energizable for moving said member to said first position, a circuit for said electro-magnetic device comprising a switch biased to closed position and held in open position when said outside door handle is in normal position, and movable to closed position upon initial operation of said outside door handle, a master switch remote from said door and connected in series with said first named switch, a pair of electro-magnetic devices selectively energizable for opening and closing said master switch, a circuit for one electro-magnetic device of said pair comprising a manually operable switch carried by the door and operable from the inside thereof for opening said master switch, and a circuit for the other electro-magnetic device of said pair comprising a normally open switch, the door having a key-controlled device operable from the outside of the door for closing said last named switch.

11. A locking system constructed in accordance with claim 10 wherein said key-controlled device comprises a member operable for closing said last named switch and having mechanical connection with said first mentioned member to mechanically move it to said first position if no current is available for said other electro-magnetic device of said pair.

12. In a door locking mechanism wherein the door is provided with a latch, an outside door handle having a normal position from which it is movable for releasing the latch, and an inside door handle for releasing the latch, and a member movable to a first position in which said outside door handle is operative for releasing the latch and to a second position in which the outside door handle is ineffective for releasing the latch; means constantly biasing said member to said second position, an electro-magnetic device energizable for moving said member to said first position, a circuit for said electro-magnetic device comprising a switch biased to closed position and held in open position when said outside door handle is in normal position, and movable to closed position upon initial operation of said outside door handle, a master switch remote from said door and connected in series with said first named switch, a pair of electro-magnetic devices selectively energizable for opening and closing said master switch, a circuit for one electro-magnetic device of said pair comprising a manually operable switch carried by the door and operable from the inside thereof for opening said master switch, and circuit means for the other electro-magnetic device of said pair comprising a pair of switches in parallel one of which is operable by said inside door handle upon a latch-releasing movement thereof for closing said master switch, the door having a key-controlled device operable from the outside of the door for closing the other switch of said pair to close said master switch.

13. In a door locking system for a plurality of doors wherein each door is provided with a locking mechanism comprising a latch, an outside door handle for releasing the latch, an inside door handle for releasing the latch, and a member movable to a first position in which said outside door handle is operative for releasing the latch and to a second position in which the outside door handle is ineffective for releasing the latch; each locking mechanism further comprising means constantly biasing said member to said second position, control means operable upon initial operation of said outside door handle for overcoming said biasing means to move said member to said first position whereby continued movement of said outside door handle will release the latch, manually operable means associated with at least one door for rendering said control means of each door ineffective for overcoming said biasing means of such door, and means operable by the inside door handle of any door upon a latch-releasing movement of such handle for rendering said manually operable means ineffective for controlling said control means.

14. In a door locking system for a plurality of doors wherein each door is provided with a locking mechanism comprising a latch, an outside door handle for releasing the latch, an inside door handle for releasing the latch, and a member movable to a first position in which said outside door handle is operative for releasing the latch and to a second position in which the outside door handle is ineffective for releasing the latch; each locking mechanism further comprising means constantly biasing said member to said second position, electro-magnetic means energizable for overcoming said biasing means to move said member to said first position, and a switch for said electro-magnetic means operable by the outside handle, a source of current, a master switch in series with said source of current, each electro-magnetic device and its switch being arranged in parallel with said master switch, means for opening said master switch for rendering each of said first named switches ineffective for completing a circuit through the associated electro-magnetic device, and means operable by either inside door handle upon a latch-releasing movement thereof for closing said master switch.

15. In a door locking system for a plurality of doors wherein each door is provided with a locking mechanism comprising a latch, an outside door handle for releasing the latch, an inside door handle for releasing the latch, and a member movable to a first position in which said outside door handle is operative for releasing the latch and to a second position in which the outside door handle is ineffective for releasing the latch; each locking mechanism further comprising means constantly biasing said member to said second position, electro-magnetic means energizable for overcoming said biasing means to move said member to said first position, and a switch for said electro-magnetic means operable by the outside handle, a source of current, a master switch in series with said source of current, each electro-magnetic device and its switch being arranged in parallel with said master switch, a pair of electro-magnetic devices respectively operable for opening and closing said master switch, a switch carried by each door and manually operable for closing a circuit through one electro-magnetic device of said pair to open said master switch, and means for closing said master switch comprising a circuit for the other electro-magnetic device of said pair, and a manually operable switch for closing said last named circuit.

16. A locking system constructed in accordance with claim 15 wherein the manually operable switch for closing the circuit through said other electro-magnetic device of said pair is arranged to be mechanically operated by one of said inside door handles.

17. In a door locking system for a plurality of doors wherein each door is provided with a locking mechanism comprising a latch, an outside door handle for releasing the latch, an inside door handle for releasing the latch, and a member movable to a first position in which said outside door handle is operative for releasing the latch and to a second position in which the outside door handle is ineffective for releasing the latch; each locking mechanism further comprising means constantly biasing said member to said second position, electro-magnetic means energizable for overcoming said biasing means to move said member to said first position, and a switch for said electro-magnetic means operable by the outside handle, a source of current, a master switch in series with said source of current, each electro-magnetic device and its switch being arranged in parallel with said master switch, a pair of electro-magnetic devices respectively operable for opening and closing said master switch, a switch carried by each door and manually operable for closing a circuit through one electro-magnetic device of said pair to open said master switch, and means for energizing the other electro-magnetic device of said pair comprising a circuit for such device having a pair of switches connected in parallel, one switch of said pair being mechanically operable by one of said inside door handles, the door which carries said last named inside door handle having a key-operated mechanism, and the other switch of said pair being operable by such mechanism.

18. In a door locking mechanism wherein the door is provided with a latch, an outside door handle for releasing the latch, and an inside door handle for releasing the latch, electro-magnetic means energizable for rendering said outside door handle normally operative for releasing the latch, a circuit for said electro-magnetic means including a switch operable upon initial movement of the outside door handle in a latch-releasing operation, a master switch in said circuit, a pair of electro-magnetic devices respectively operable for opening and closing the electro-magnetic devices of said pair, a circuit for the electro-magnetic device of said pair which opens said master switch, a push button for closing said last named circuit, and a circuit for the electro-magnetic device of said pair which closes said master switch and including a control switch operable for closing such circuit upon a latch-releasing operation of said inside door handle.

19. Apparatus constructed in accordance with claim 18 provided with a key-operated mechanism for closing said control switch.

JEANNOT G. INGRES.
DAVID T. AYERS, Jr.

REFERENCES CITED

The following references are of record in the file of this patent:

UNITED STATES PATENTS

| Number | Name | Date |
| --- | --- | --- |
| 2,212,251 | Seelinger | Aug. 20, 1940 |
| 2,329,309 | Ward et al. | Sept. 14, 1943 |